United States Patent [19]

Tolles

[11]  4,171,866
[45]  Oct. 23, 1979

[54] DISPOSABLE VOLUMETRIC SLIDE

[76] Inventor: Walter E. Tolles, Lee Hwy., Rte. 1, Fairfield, Va. 24435

[21] Appl. No.: 898,087

[22] Filed: Apr. 20, 1978

[51] Int. Cl.² .............................................. G01B 21/34
[52] U.S. Cl. ...................................... 350/95; 356/244
[58] Field of Search ............................. 350/95, 92, 94; 356/244; 73/425.4 R, 425.4 P

[56] References Cited

U.S. PATENT DOCUMENTS

| | | | |
|---|---|---|---|
| 3,198,064 | 8/1965 | Moore | 356/244 |
| 3,609,045 | 9/1971 | Stein | 356/244 |

Primary Examiner—Jon W. Henry
Attorney, Agent, or Firm—B. P. Fishburne, Jr.

[57] ABSTRACT

A disposable low cost laboratory slide for measuring particle concentration has a base plate in the form of a standard microslide whose thickness is compatible with microscope optics. Tapes of precise thickness formed of chemically inactive material and possessing mechanical stability are adhesively bonded to the base plate in spaced relationship, the thickness of the tapes establishing a precision depth for a volumetric slide chamber. A thin coverslip of standard thickness overlies the tapes and is bonded thereto, the thickness of the coverslip also being compatible with microscope optics. The disposable slide is used in a simple optical system with magnification wherein the field of interest is focused on a precision graticle or screen enabling precise measurement of the area of the slide volumetric chamber, following which the precise volume of the chamber can be determined and the concentration of particles in a specimen within the chamber calculated with precision.

8 Claims, 5 Drawing Figures

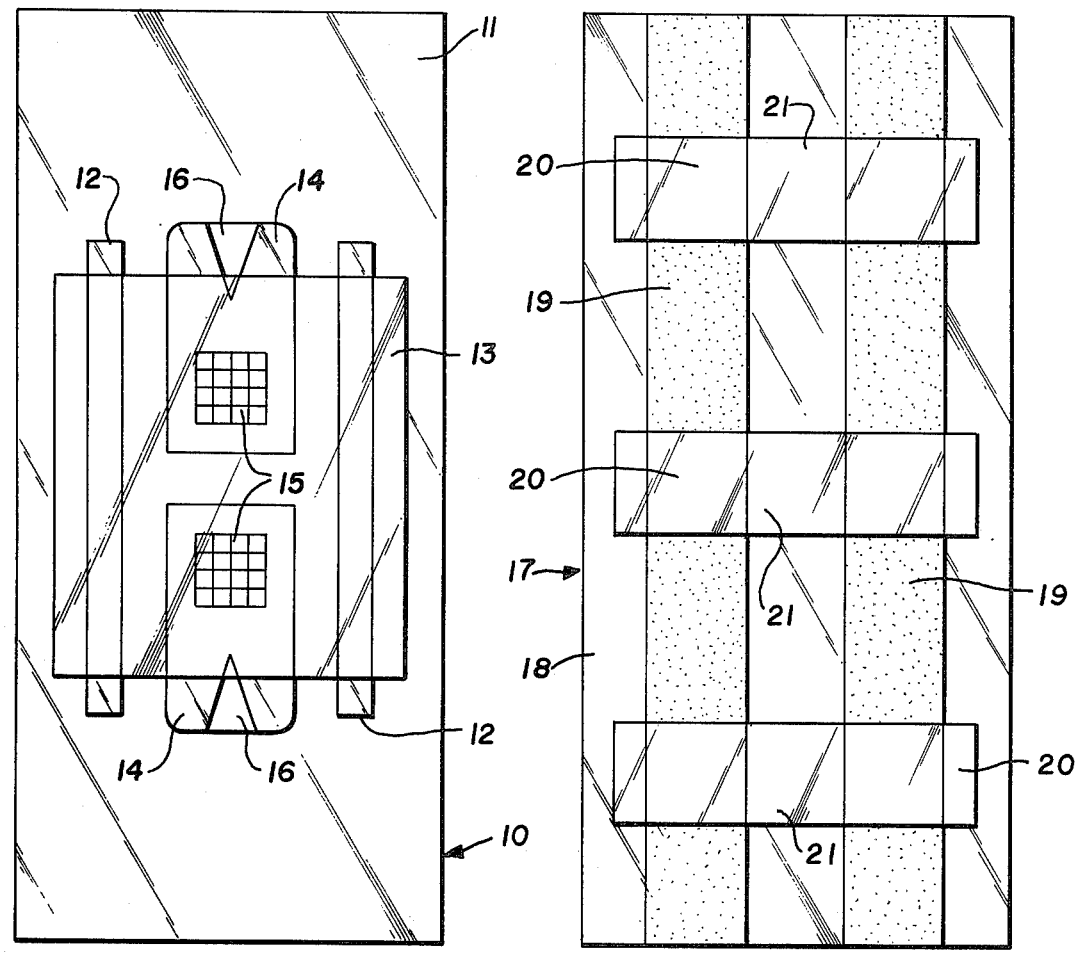
FIG. 1 PRIOR ART
FIG. 3
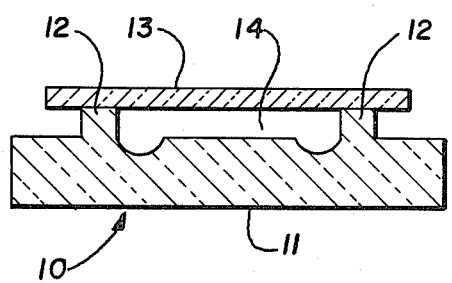
FIG. 2 PRIOR ART

HUMAN OBSERVER OR TV CAMERA

PRECISION DEFINED AREA X,Y

MAGNIFICATION
$M = q/P$

PRECISION DEPTH z

PRECISION SYNTHETIC AREA X,Y

PRECISION SYNTHETIC VOLUME
$V = z(X/M)(YM)$

DISPOSABLE VOLUMETRIC SLIDE

BACKGROUND OF THE INVENTION

All clinical laboratories, and many medical, biological and industrial laboratories make use of a reusable hemocytometer for measuring the concentration of particles in suspension. Such measurement is commonly made for blood cells, bacteria, cells from tissue culture, washings, scrapings and the like.

Particle concentration=number of particles/unit volume of suspension. Thus, one must be able to define precisely both of these quantities, number and volume.

The traditional hemocytometer, standard on a worldwide basis, is a volumetric slide having a specimen chamber of great accuracy. However, the traditional hemocytometer is quite costly to manufacture involving precise grinding and etching of glass, is fragile, and requires thorough washing after each usage in the laboratory. This washing is quite expensive on a commercial basis. Even more importantly, the traditional prior art device is not well suited to mechanized high speed measurement of concentration. It does, however, possess a true precision volumetric chamber formed integrally therein in terms of area and depth on x, y and z axes.

The objective of the present invention is to provide a very inexpensive disposable or single-use volumetric slide which may be employed for the purposes of the traditional reusable hemocytometer or slide, but without the high cost of manufacturing and necessity for washing. The device of the invention is constructed of standard low cost components which in assembled relationship form a volumetric slide having a chamber or chambers of high precision depth on the z axis comparable to the precision depth of the chamber afforded by the expensive hemocytometer.

In contrast to the prior art, the chamber area parameters are not provided or inscribed integrally on the slide but are determined with great accuracy by use of a simple optical magnification system employed in conjunction with the disposable slide. In this optical system, the x-y axis measurements of the precision slide volumetric chamber are optically projected on a reference plane or screen, following which the volume of the slide chamber can be calculated with great accuracy, followed by precision determination of particle concentration.

In effect, the use of the inexpensive disposable slide with integral precision chamber depth when used in the magnifying optical system enables the ready determination of what may be termed "a precision synthetic area" and "a precision synthetic volume" through simple multiplication of x, y, z axis dimensions with a magnification factor included in the computation.

Among the advantages inherent in the single use disposable slide structure and method of use are:

(1) The coverslip is of standard thickness glass for which the microscope objectives have been designed, thereby improving the optical quality of images.

(2) The slide base plate is a standard flat glass microslide whose thickness is designed into the condenser optics, again improving optical quality.

(3) The slide assembly is so inexpensive that it can be discarded after the test, saving the not inconsiderable cost of washing, and obviating any possibility of specimen carry-over from test-to-test, as can sometimes occur in the prior art.

To comply with the duty to disclose any known prior art under 37 C.F.R. 1.56, the following prior U.S. Pat. Nos. are made of record herein: 3,551,023, 3,556,633, 3,656,833, 3,777,283, 4,022,521.

BRIEF DESCRIPTION OF THE DRAWINGS

FIG. 1 is a plan view of a precision chamber hemocytometer in accordance with the prior art.

FIG. 2 is an end elevational view thereof.

FIG. 3 is a plan view of a disposable volumetric slide usable as a hemocytometer constructed in accordance with the invention.

DETAILED DESCRIPTION

Figure 4:
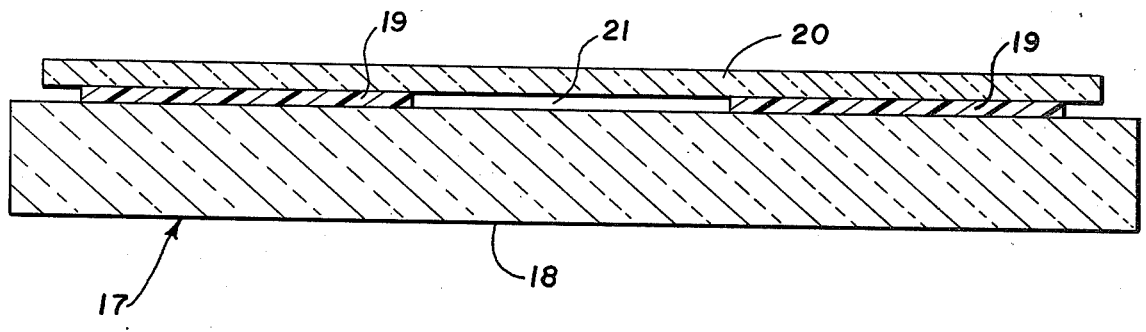
FIG. 4 is an end elevation of the volumetric slide.

Referring to the drawings in detail wherein like numerals designate like parts, and initially considering FIGS. 1 and 2 which show the prior art, a standard hemocytometer 10 of the kind employed in laboratories on a world-wide basis comprises a glass base plate 11 having a pair of raised spaced parallel supporting lands 12 for the support of a cover glass or slip 13. Between the lands 12 and beneath the slip 13, a precision depth chamber 14 is formed by a process of grinding, etching, or both. The bottom surface of the chamber 14 is inscribed with precision to form a very accurately sized rectangular x-y axis specimen area 15. As shown in FIG. 1, a pair or more of the areas 15 and a pair or more of chambers 14, or a continuous elongated chamber, may be provided on the standard hemocytometer of the prior art. Each chamber 14 preferably has a V-notch 16 at one end thereof to receive an aliquot of suspended particles drawn from a specimen. After introduction into the V-notch, the aliquot spreads out by capillary action to cover the accurately defined area 15 of the chamber. A short time interval is allowed for the suspended particles to settle to the bottom of the precision depth chamber.

With the use of microscope, the number of cells or particles lying in some specified portion of the inscribed area 15 is counted, thereby yielding a number N. The specification of the area counted, when multiplied by the constant precise depth of the chamber 14, yields the volume V from which the concentration of particles or cells can be computed, as follows:

Concentration=number of particles (N)/unit volume (V) of suspension.

Thus, one must be able to precisely define both quantities N and V, and the traditional prior art hemocytometer yields these quantities with superb accuracy. However, as previously stated, the traditional device is quite expensive, relatively fragile, and requires careful washing to avoid carry-over from test-to-test.

Referring now to FIGS. 3 and 4, a very low cost single use disposable volumetric slide 17 constructed in accordance with the invention consists of a flat rectangular glass base plate 18 which may be a standard microslide whose thickness is optically compatible with the microscope optical system, to be described, also forming a part of the invention. It may be noted here that the thicknesses of the traditional hemocytometer elements 11 and 13 are customarily not designed for optical compatibility with microscope objectives. Thus, the slide 17 of this invention will contribute in the overall optical system of FIG. 5 to improve quality of optical images.

The slide assembly 17 additionally comprises, in lieu of the precision ground glass lands 12 and chamber 14 of the prior art, a pair of sapced parallel tape sections 19 formed of precision thickness Mylar, Teflon or other chemically inactive plastic tape possessing mechanical stability. Such tapes are readily available on the market and their precision thicknesses do not vary more than 0.1% in a run of 150 feet or more. Such tapes are available with adhesive on one or both sides thereof and the thickness of the adhesive coating or coatings is included in the precision thickness of the tape sections 19 which determines the precision z axis depth of the slide chamber or chambers. Preferably, the tape sections 19 are adhesive coated on both sides so that one side of each tape section can be adhered to the base plate 18, as illustrated.

At one or more points along the slide assembly 17, a standard thin flat glass cover slip 20 is placed over and adhered to the upper adhesive faces of the tape sections to complete the slide assembly 17 which provides one or more precision depth volumetric chambers 21 each adapted to receive a small amount of particles or cells suspended in fluid. As with the prior art reusable device, the fluid suspension will migrate over the entire area of the chamber 21 by capillary action and after a short time interval, the suspended particles to be counted will settle.

In the disposable slide assembly 17, the glass coverslip 21 has a standard thickness for which the microscope objectives have been designed and this improvement feature does not exist in the prior art.

In terms of this compatibility with microscope optics, the base plate 18 is preferably 25 mm×75 mm×1 mm, while the coverslip 20 is preferably 6 mm wide×0.18 mm thick. The precision thickness of tape sections 19 may be varied in the invention but in all cases will be constant. Typically, the tape thickness including adhesive coatings will cover the range of approximately 0.05–0.15 mm. The dimensions can be smaller or larger in some cases, but this is a useful range.

Figure 5:
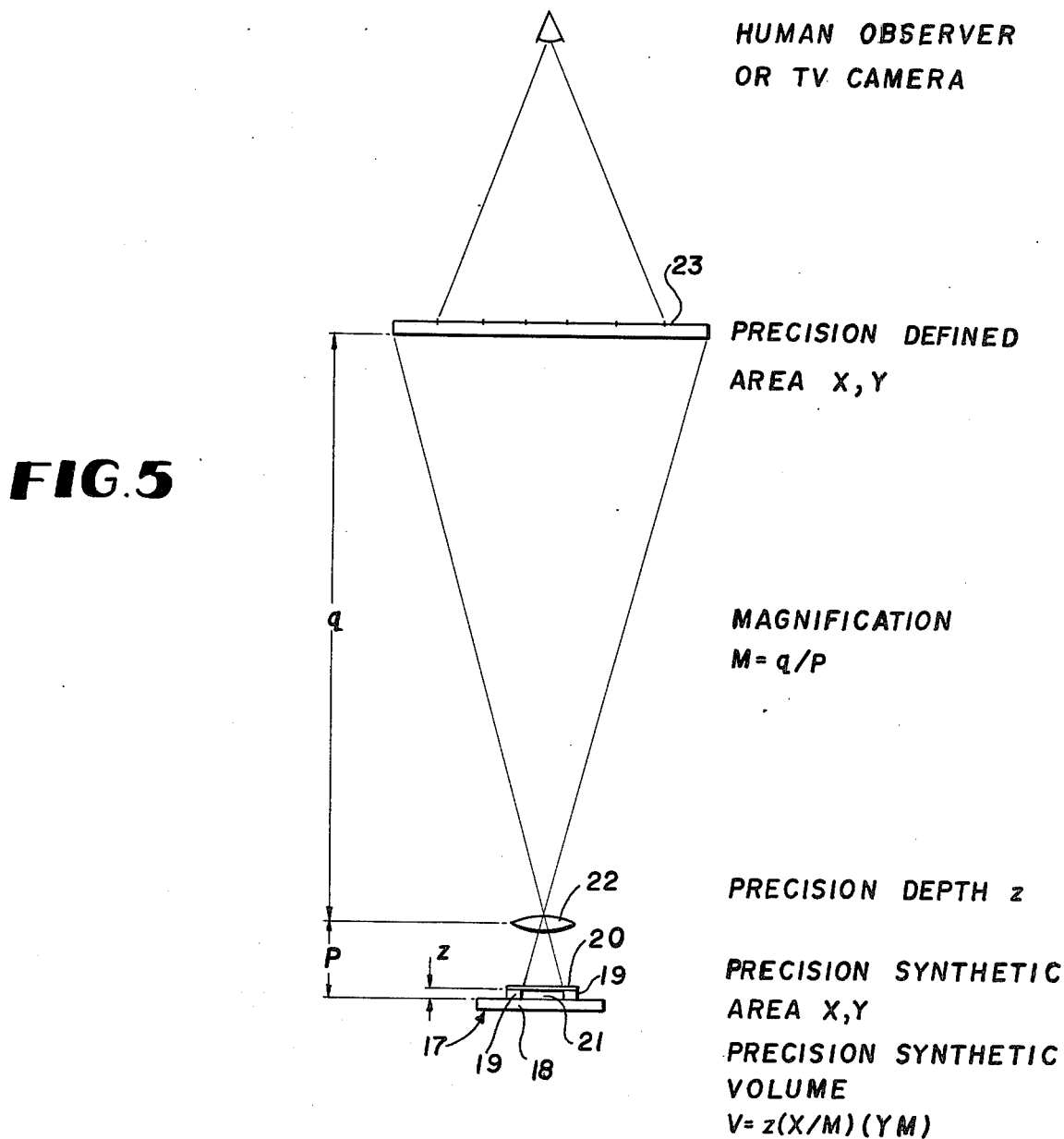
FIG. 5 is a schematic view of an optical system with which the slide is employed in the practice of the method.

In contrast to the standard reusable hemocytometer, there is no precision area inscribed on the base plate 18 for chamber or chambers 21, and this precision area is obtained by use of the optical system shown in FIG. 5 in conjunction with the disposable slide assembly 17.

Referring to FIG. 5, the slide assembly 17 is supported on a microscope in spaced relationship to the microscope objective lens 22. Some degree of magnification of the particles such as bacteria or blood cells is necessary for proper identification and counting. The field of interest is focused on a precision graticle 23 or a calibrated screen on which the width and length of the volumetric chamber can be precisely determined. If the projected field falls on an area X-Y where X and Y are precisely determined, then the synthetic area of the actual chamber 21 is (X/M) (Y/M) where (M) is the magnification of the optical projector. (M) must be known with precision and which precision is provided by microscope objectives. Thus, the volume (V) of the synthetic precision volumetric chamber is found from the expression:

V = z precision depth (x) (y)
V = z precision depth (X/M) (Y/M)

Referring again to FIG. 5, the magnification M=q/p.

In the simple optical system disclosed, if one has a television microscope, the precision area X-Y can be automatically determined under the present state of the art.

To summarize the invention in essence, a very low cost slide assembly 17 is produced in the described manner which possesses one or more precision depth Z axis chambers 21 without resorting to the expensive techniques of the prior art. However, no precision area or areas are directly inscribed on the slide assembly 17 for the chambers 21 as was done in the prior art, again reducing the manufacturing costs of the disposable slide assembly. In lieu of the integral precision areas 15 of the prior art, the slide assembly 17 is used in and effectively becomes a part of the microscope optics and projection system shown in FIG. 5, whereby the precision synthetic area x-y may be accurately defined and measured on the graticle or screen 23 and the precision synthetic volume can be calculated with the magnification factor included. The determination of particle concentration can then be determined in a straight-forward manner once the volume of the precision chamber 21 is known, concentration being simply the number of particles in a given precision area divided by the unit volume of the suspension containing the particles. It can thus be seen that the invention is embodied in a unique low cost disposable slide assembly and a method of using the slide assembly in a simplified precision optical system with magnification.

While the thickness of the tape utilized for the lands 19 of the disposable precision chamber slide is very precise and uniform, nevertheless the invention has the capability of easily correcting or compensating for any small variations in tape thickness which would effect the precision depth z of chamber 21. Such correction can be accomplished with a standard microscope simply by establishing two precise optical planes whose distance apart defines the depth of the precision chamber. This correction is accomplished whenever necessary by the optical system of FIG. 5. This versatility of the invention in the overall is a further advantage over the prior art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A disposable laboratory slide comprising a base plate, a pair of spaced precision thickness tape sections on said base plate defining lands, at least one coverslip on said tape sections and being supported by the tape sections and forming therewith and with the base plate a slide volumetric chamber having a precision depth and an area, the inner edges of said tape sections defining side edges of said volumetric chamber, whereby particles in a fluid suspension to be counted may be introduced into said chamber preparatory to measuring the concentration of particles in a unit volume of a fluid suspension of particles.

2. A disposable laboratory slide as defined in claim 1, and said base plate being a flat rectangular glass plate and said coverslip being a thin flat glass element, said tape sections being formed of precision thickness chemically inactive plastics.

3. A disposable laboratory slide as defined in claim 1, and said tape sections being adhesively bonded in assembled relationship with said base plate and coverslip.

4. A disposable laboratory slide as defined in claim 3, and adhesive material on the opposite sides of the tape sections facing said base plate and coverslip.

5. A disposable laboratory slide as defined in claim 2, and said glass base plate and tape sections being elongated with the tape sections in parallel relationship and a plurality of coverslips on the tape sections transversely and defining therewith and with the base plate a plurality of volumetric chambers in said disposable laboratory slide.

6. A disposable laboratory slide as defined in claim 5, and said base plate, tape sections and said coverslips being adhesively bonded in sandwiched relationship.

7. A disposable laboratory slide as defined in claim 2, and said tape sections being Mylar tape sections.

8. A disposable laboratory slide comprising a base plate, a pair of preformed spaced precision uniform thickness thin spacing elements having flat top and bottom faces mounted on and adhered to the base plate, at least one coverslip resting on said spacing elements and adhered thereto and supported thereby and forming therewith and with the base plate a slide volumetric chamber having a precision depth and an area, the inner edges of said spacing elements defining side edges of said volumetric chamber, whereby particles in a fluid suspension to be counted may be introduced into said chamber preparatory to measuring the concentration of particles in a unit volume of a fluid suspension of particles.

* * * * *